United States Patent [19]

Nakata et al.

[11] Patent Number: 5,449,881
[45] Date of Patent: Sep. 12, 1995

[54] LASER BEAM MACHINE

[75] Inventors: Yoshinori Nakata; Kazuki Ohara, both of Minamitsuru, Japan

[73] Assignee: Fanuc Ltd., Minamitsuru, Japan

[21] Appl. No.: 193,020

[22] Filed: Feb. 7, 1994

[30] Foreign Application Priority Data

Jun. 25, 1992 [JP] Japan .................................. 4-167641

[51] Int. Cl.⁶ ............................................ B23K 26/14
[52] U.S. Cl. ............................ 219/121.67; 219/121.6; 219/121.73
[58] Field of Search ............ 219/121.11, 121.6, 121.61, 219/121.62, 121.67, 121.68, 121.73, 121.78, 121.8, 121.81

[56] References Cited

U.S. PATENT DOCUMENTS

| | | | |
|---|---|---|---|
| 4,649,256 | 3/1987 | Minamida et al. | 219/121.63 |
| 4,698,480 | 10/1987 | Klingel | 219/121.67 |
| 4,720,621 | 1/1988 | Langen | 219/121.6 |

FOREIGN PATENT DOCUMENTS 61-189887 8/1986 Japan .
61-189893 8/1986 Japan .

*Primary Examiner*—Bruce A. Reynolds
*Assistant Examiner*—Tu Hoang
*Attorney, Agent, or Firm*—Staas & Halsey

[57] ABSTRACT

A laser beam machine is provided for irradiating a laser beam onto a workpiece to cut the same. When cutting a workpiece by irradiating a laser beam thereto, stable and reliable corner cutting is carried out according to a machining condition which provides practical effects. It is determined whether the machining (cutting) along a path according to a currently executed machining program has advanced to a corner B (Step S1), and if the corner B is reached, cutting is carried out according to a stepwise-varying machining condition M previously stored in a RAM (3) (Step S2). Specifically, the machining condition is once reduced to a low level or zero when the corner B is reached, and is thereafter increased stepwise up to a normal machining condition $M_0$ with distance from the corner (with time). After the cutting of the corner B is completed, normal cutting is carried out according to the machining condition $M_0$ (Step S3). Thus, it is possible to carry out stable and reliable cutting of the corner B according to the machining condition that provides practical effects.

3 Claims, 5 Drawing Sheets

FIG. 4

| Machining Condition Number | Machining Condition M | | | | |
|---|---|---|---|---|---|
| | STEP 1 | STEP 2 | STEP 3 | | STEP n |
| 1 | $F_{11}$<br>$S_{11}$<br>$P_{11}$<br>$Q_{11}$<br>$K_{11}$ | $F_{12}$<br>$S_{12}$<br>$P_{12}$<br>$Q_{12}$<br>$K_{12}$ | $F_{13}$<br>$S_{13}$<br>$P_{13}$<br>$Q_{13}$<br>$K_{13}$ | | $F_{1n}$<br>$S_{1n}$<br>$P_{1n}$<br>$Q_{1n}$<br>$K_{1n}$ |
| 2 | $F_{21}$<br>$S_{21}$<br>$P_{21}$<br>$Q_{21}$<br>$K_{21}$ | $F_{22}$<br>$S_{22}$<br>$P_{22}$<br>$Q_{22}$<br>$K_{22}$ | $F_{23}$<br>$S_{23}$<br>$P_{23}$<br>$Q_{23}$<br>$K_{23}$ | | $F_{2n}$<br>$S_{2n}$<br>$P_{2n}$<br>$Q_{2n}$<br>$K_{2n}$ |
| n | $F_{n1}$<br>$S_{n1}$<br>$P_{n1}$<br>$Q_{n1}$<br>$K_{n1}$ | $F_{n2}$<br>$S_{n2}$<br>$P_{n2}$<br>$Q_{n2}$<br>$K_{n2}$ | $F_{n3}$<br>$S_{n3}$<br>$P_{n3}$<br>$Q_{n3}$<br>$K_{n3}$ | | $F_{nn}$<br>$S_{nn}$<br>$P_{nn}$<br>$Q_{nn}$<br>$K_{nn}$ |

F = MACHINING SPEED, S = PEAK OUTPUT
P = FREQUENCY, Q = DUTY FACTOR
K = DISTANCE OR TIME OF CONTINUANCE OF MACHINING CONDITION

LASER BEAM MACHINE

FIELD OF THE INVENTION

The present invention relates to a laser beam machine for irradiating a laser beam onto a workpiece to cut the same. More particularly, the present invention relates to a laser beam machine for cutting corners under predetermined machining conditions.

DESCRIPTION OF THE RELATED ART

When cutting a corner shape by a laser beam, situations are likely to arise where a corner is melted and thus lost due to heat. To avoid such situations, various methods for achieving stable corner cutting have been proposed and implemented.

FIGS. 5(a) and 5(b) illustrate conventional corner cutting methods, wherein FIG. 5(a) shows a cutting path, and FIGS. 5(b), 5(c) and 5(d) each show a machining condition pattern. As shown in FIG. 5(a), the machining path extends from a point A to a point C via a corner B, and corner cutting is carried out at the point B. In FIGS. 5(b), 5(c) and 5(d), the axis of ordinate indicates machining condition M1, and the axis of abscissa indicates machining position or machining time. The machining condition M1 comprises a cutting speed F, and laser beam output command values including a peak output S, a frequency P and a duty factor Q.

In the machining method shown in FIG. 5(b), the machining condition M1 is changed at the corner B through a feedback of an actual movement of a workpiece, i.e., an actual speed at which a table is actuated. In this method, the time constant of actual acceleration/deceleration of the table is set to a value small enough to improve the shaping accuracy. Even if the machining condition M1 is controlled only for a time period involving the cutting of the corner B, there is almost no difference between the controlled machining and the uncontrolled machining. Thus, no practical effects are obtained.

In the machining method shown in FIG. 5(c), the laser output is interrupted at the corner B, in order to reduce the influence of heat at the corner B. After a natural or forced cooling for a fixed period of time, the subsequent machining is started. In this method, the laser output must be stopped for a considerably longer time to achieve sufficient cooling at the corner B.

The machining method shown in FIG. 5(d) is a combination of the methods shown in FIGS. 5(b) and 5(c), and has the problems associated with these methods (b) and (c).

As described above, the prior art methods fail to provide a stable and reliable technique for machining corners. This is because the prior art techniques are focused on optimum machining condition settings for the cutting speed (FIGS. 5(b) and 5(d)) or on the elimination of concentration of heat (FIGS. 5(c) and 5(d)), and are unable to provide practical effects or require an excessively long machining time.

SUMMARY OF THE PRESENT INVENTION

The present invention was created in view of the above circumstances, and an object thereof is to provide a laser beam machine capable of carrying out stable and reliable corner cutting under machining conditions that provide practical effects.

To achieve the above object, the present invention provides a laser beam machine for irradiating a laser beam onto a workpiece to cut the same, wherein, when cutting a workpiece along a machining path having a corner, the workpiece is cut according to a stepwise-varying machining condition after the corner is cut.

When cutting a workpiece along a machining path having a corner, the cutting process for a path portion following the corner is carried out in accordance with a machining condition which varies stepwise. According to this stepwise-varying machining condition, the machining condition is not modified in a region where practical effects are not obtained, e.g., before the corner is reached, and is modified only in a region where practical effects are obtained, i.e., after the corner is passed. Accordingly, dissipation and concentration of heat can be optimized at the corner where the influence of heat is great. That is, it is possible to carry out stable and reliable cutting of corners according to the machining condition that provides practical effects.

BRIEF DESCRIPTION OF THE DRAWINGS

FIGS. 3(a) and 3(b) illustrate a machining condition for corner cutting according to the present invention, wherein FIG. 3(a) shows a machining path, and FIG. 3(b) shows a machining condition pattern;

FIG. 4 is a chart illustrating machining conditions; and

FIGS. 5(a), 5(b), 5(c) and 5(d) illustrate conventional corner cutting methods, wherein FIG. 5(a) shows a machining path, and FIGS. 5(b), 5(c) and 5(d) each show a machining condition pattern.

DETAILED DESCRIPTION OF THE PREFERRED EMBODIMENTS

An embodiment of the present invention will be now described with reference to the drawings.

Figure 2:
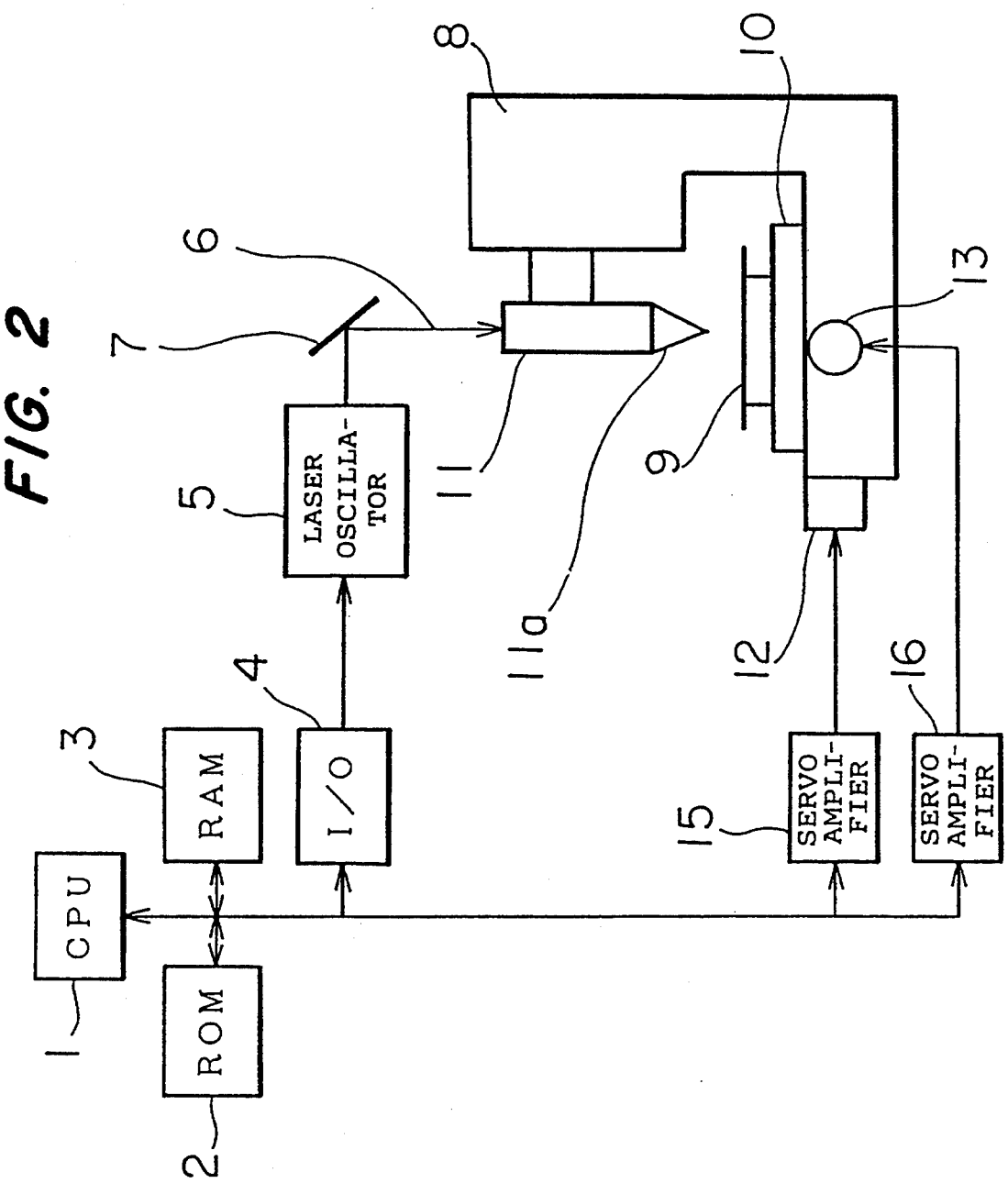
FIG. 2 is a block diagram of a laser beam machine according to the present invention.

FIG. 2 is a block diagram of a laser beam machine according to the present invention. A processor 1 reads a machining program stored in a RAM 3, in accordance with a control program stored in a ROM 2, and globally controls the operation of the laser beam machine. An I/O unit 4 converts control signals from the processor 1 and supplies the converted signals to a laser oscillator 5. The laser oscillator 5 emits a pulsed laser beam 6 in accordance with the converted control signals. The laser beam 6 is reflected at a bending mirror 7 and enters a machine body 8.

The machine body 8 comprises a table 10 on which a workpiece 9 is fixed, and a machining head 11 for irradiating the laser beam onto the workpiece 9. The laser beam 6 introduced into the machining head 11 is converged by a nozzle 11a and is irradiated onto the workpiece 9. The machine body 8 is also provided with servomotors 12 and 13 for moving the table 10 in directions along X and Y axes. The servomotors 12 and 13 are connected to servo amplifiers 15 and 16, respectively, and their rotations are controlled in accordance with axis control signals from the processor 1. The machining position of the workpiece 9 and a cutting speed F are controlled through the rotation control of the servomotors.

A machining condition for a cutting process executed by the laser beam machine constructed as above will be now described.

Figure 3A:
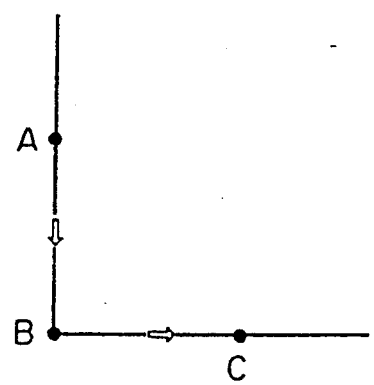
Figure 3B:
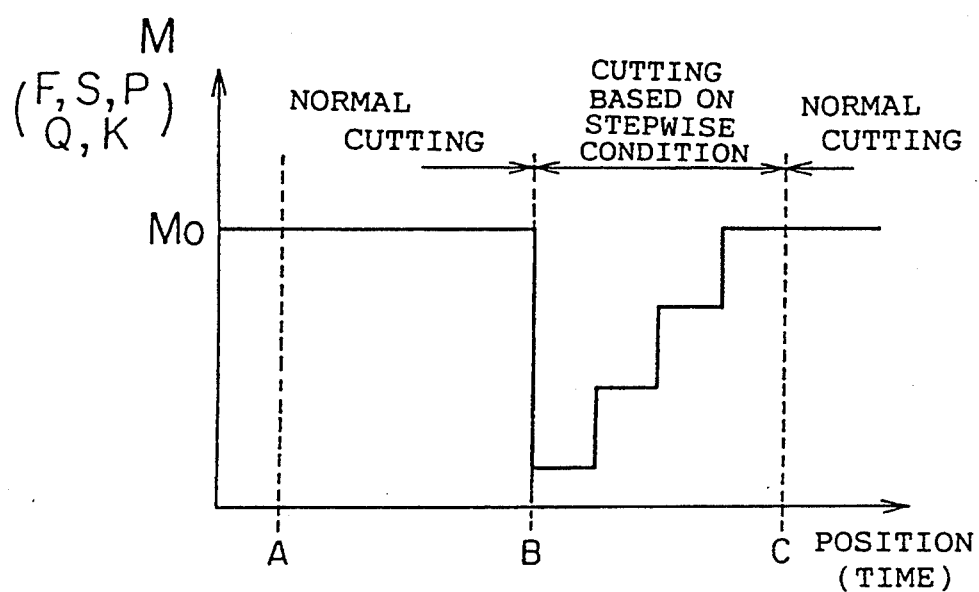
Figure 5A:
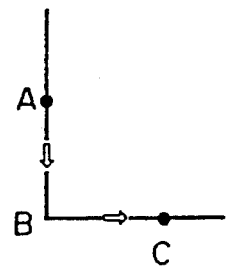
Figure 5B:
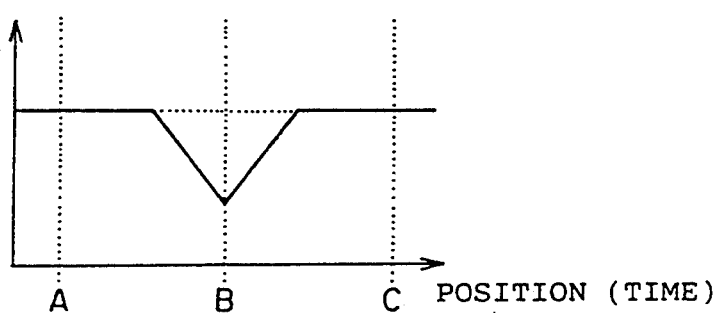
Figure 5C:
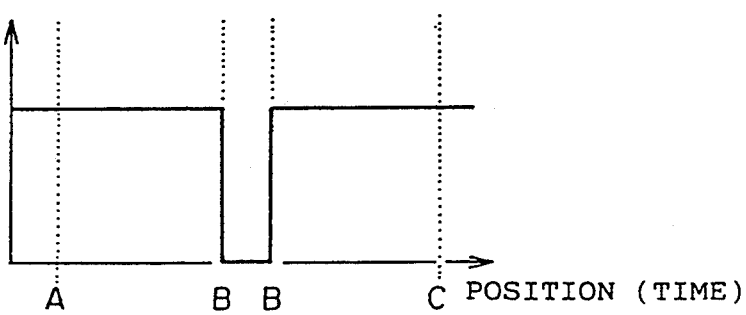
Figure 5D:
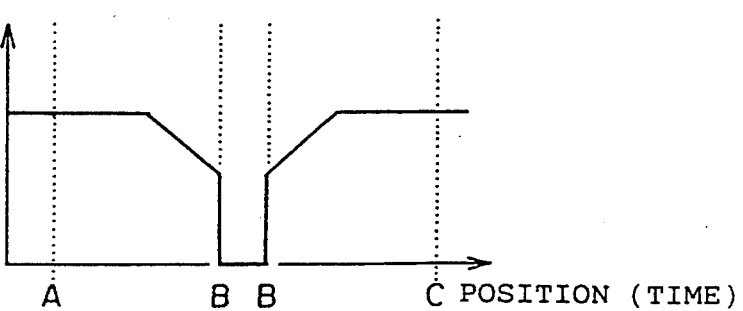

FIGS. 3(a) and 3(b) illustrate the machining condition for a corner cutting according to the present invention, wherein FIG. 3(a) shows a machining path, and FIG. 3(b) shows a machining condition pattern. As shown in FIG. 3(a), the machining path extends from a point A to a point C via a corner B, and corner cutting is effected at the point B. In FIG. 3(b), the axis of ordinate indicates a machining condition M, and the axis of abscissa indicates the machining position or machining time. The machining condition M comprises the cutting speed F, laser beam output command values including a peak output S, a frequency P and a duty factor Q, and a distance or time K of continuance of the machining condition. As shown in FIG. 3(b), the machining condition M composed of these factors is maintained at a normal machining condition $M_0$ before the corner B is reached, and is once reduced to a low level or "0" when the corner B is reached. After the corner B is passed, the machining condition is increased stepwise up to the normal machining condition $M_0$ with distance from the point B (with lapse of time).

Figure 1:
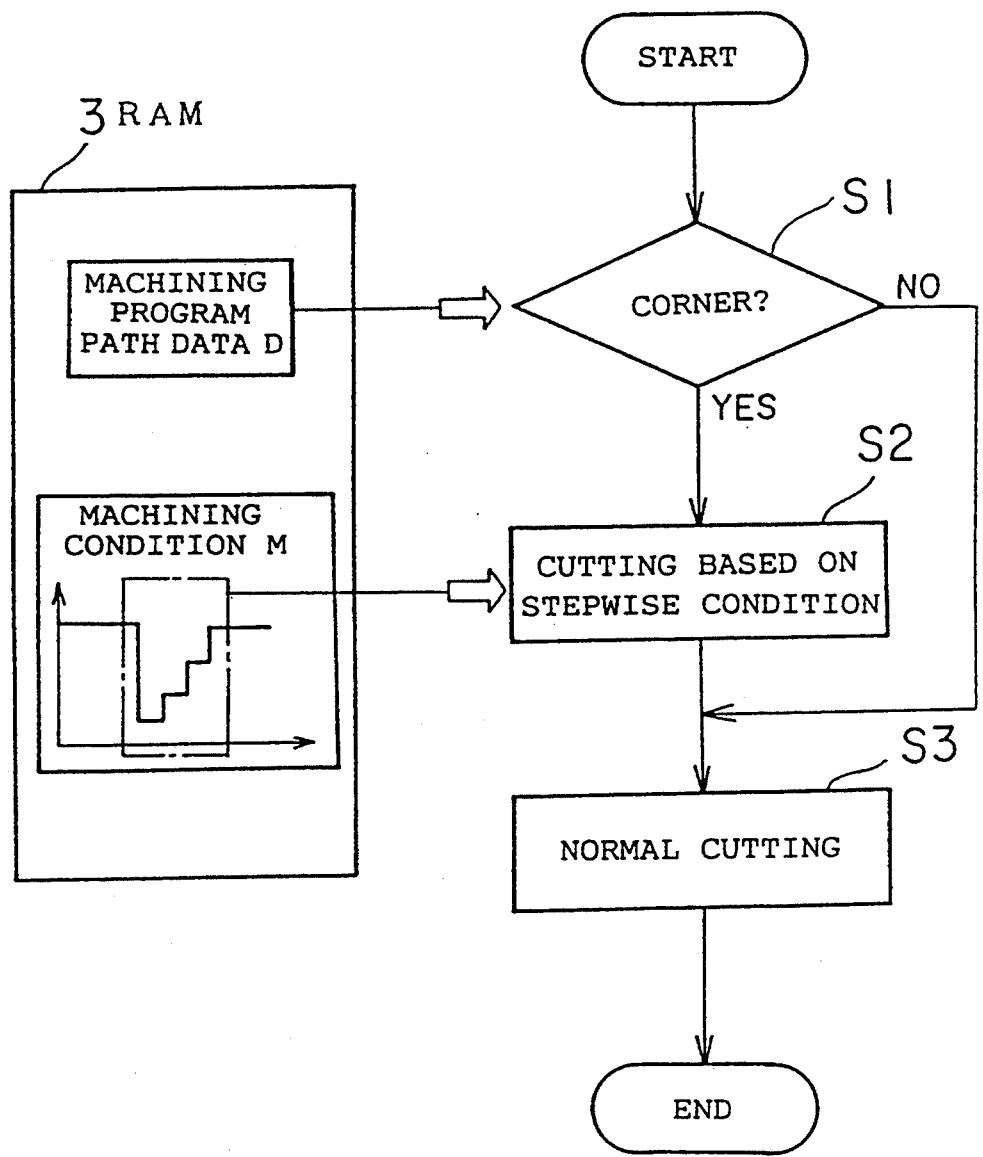
FIG. 1 is a flowchart illustrating a cutting process executed according to the present invention.

FIG. 1 is a flowchart of a cutting process according to the present invention. In FIG. 1, numbers following "S" represent step numbers.

In step S1, whether the machining (cutting) along the path according to a currently executed machining program has advanced to the corner B is determined. If the corner B is reached, the program proceeds to Step S2, and if not, the program proceeds to Step S3. This determination is made based on machining program path data D stored in the RAM 3.

In step S2, cutting is carried out in accordance with the stepwise-varying machining condition previously stored in the RAM 3. Specifically, the machining condition is once reduced to a low level or "0" when the corner B is reached, and is thereafter increased stepwise up to the normal machining condition $M_0$ with distance from the point B (with time).

In step S3, normal cutting is carried out in accordance with the machining condition $M_0$.

FIG. 4 illustrates machining conditions. As illustrated FIG. 4, a plurality of machining conditions M are set according to machining condition numbers, i.e., the material or thickness of a workpiece. As mentioned above, each machining condition M is composed of the cutting speed F, the output command values for the laser beam 6 including the peak output S, frequency P and duty factor Q, and the distance or time K of continuance of the machining condition (the distance or time of continuance of each step), and these factors increase stepwise from step 1 to step n.

In the embodiment described above, when the workpiece 9 is cut along the machining path having the corner B, the cutting process for a path portion following the corner B is carried out in accordance with the machining condition M which increases stepwise. According to this stepwise-increasing machining condition M, the machining condition is not modified in a region where practical effects are not obtained, e.g., before the corner B is reached, and is modified only in a region where practical effects are obtained, i.e., after the corner B is passed. Accordingly, dissipation and concentration of heat can be optimized at the corner B where the influence of heat is great. In other words, it is possible to carry out stable and reliable cutting of the corner B according to the machining condition that provides practical effects.

As described above, according to the present invention, when cutting a workpiece along a machining path having a corner, the cutting process for a path portion following the corner is carried out in accordance with a machining condition which varies stepwise. According to this stepwise-varying machining condition, the machining condition is not modified in a region where practical effects are not obtained, e.g., before the corner is reached, and is modified only in a region where practical effects are obtained, i.e., after the corner is passed. Accordingly, dissipation and concentration of heat can be optimized at the corner where the influence of heat is great. That is, it is possible to carry out stable and reliable cutting of corners according to the machining condition that provides practical effects.

We claim:

1. A laser beam machine, executing a machining program, for cutting workpieces, each having a shape comprising at least one corner, the laser beam machine cutting each workpiece by irradiating a laser beam onto the workpiece, said laser beam machine comprising:

machining shape determining means for reading the machining program and determining whether the shape being machined is one of the at least one corner;

store means for storing stepwise machining conditions comprising sets of cutting speeds and output command values in accordance with one of materials and thickness of the workpieces; and machining command means for instructing the laser beam machine to cut the workpiece according to said stepwise cutting speeds and output command values from said stepwise machining conditions wherein the cutting speed is varied when the shape being machined is the one of the at least one corner.

2. The laser beam machine according to claim 1, wherein the stepwise machining conditions comprise levels of values varying stepwise and continuously, said levels comprising zero and a low level, and the stepwise machining conditions being once reduced to one of the low level and the zero when the one of the at least one corner is reached, and being increased stepwise and continuously on and after the one of the at least one corner is cut.

3. The laser beam machine according to claim 1, wherein the output command values comprise at least one of the peak output, duty factor, frequency for the laser beam machine, and distance and time of continuance of the machining conditions.

* * * * *